April 29, 1941.
A. A. SCARLETT
2,240,147
HARROW
Filed May 25, 1940
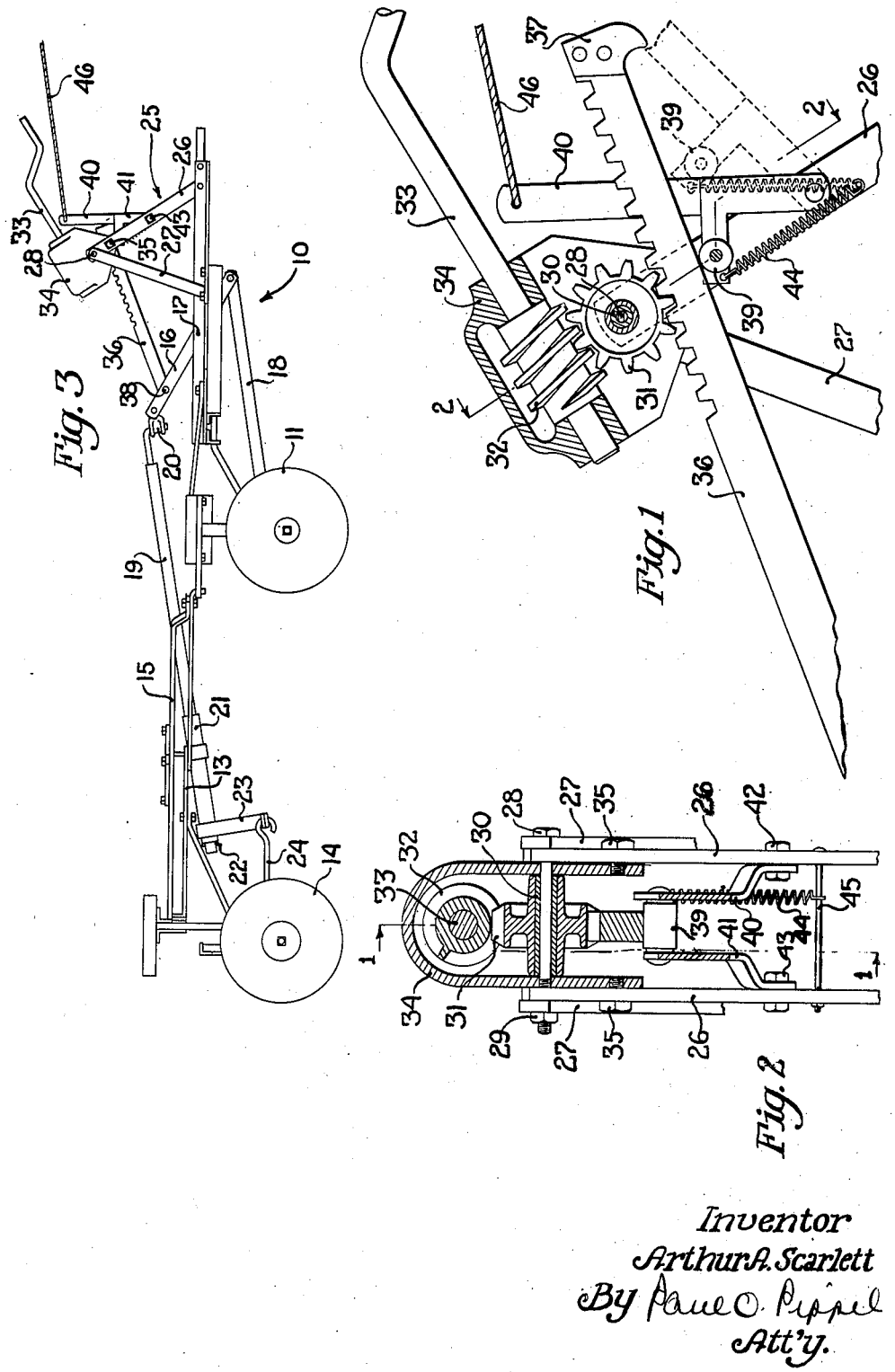
Inventor
Arthur A. Scarlett
By Paul O. Pippel
Att'y.

Patented Apr. 29, 1941

2,240,147

UNITED STATES PATENT OFFICE 2,240,147

HARROW

Arthur A. Scarlett, Hamilton, Ontario, Canada, assignor, by mesne assignments, to International Harvester Company, Chicago, Ill., a corporation of New Jersey Application May 25, 1940, Serial No. 337,229

9 Claims. (Cl. 55—83)

This invention relates to a harrow. More specifically it relates to a device for angling the gangs of a harrow, either by hand or by draft forces.

It is known in devices such as a harrow to have either a hand angling device such as a rack and pinion or a threaded crank and nut or a draft and link device by means of which angle of the gangs may be changed, either by backing of the harrow or by a forward motion thereof. In some instances it is desirable to provide a harrow with both types of angling devices. The hand angling device is necessary for a very accurate adjustment of the angle of the gangs, and yet a draft angling device may be required in the event that the harrow becomes stuck in soft ground, and it is necessary to take the gangs out of angle so that the tractor may pull the harrow out of the soft spot.

An object of the present invention is to provide an improved harrow.

Another object is the provision of a harrow with a device for angling the gangs which may be operated either by hand or by draft forces applied to the tractor.

According to the present invention a gear and rack in engagement with one another are positioned on the frame of a tractor. The rack is connected with the harrow gangs so that rotation of the gear causes a longitudinal movement of the rack and accordingly a change in the angle of the gang. A spring-urged member holds the rack in engagement with the gear, and, when it is desired to change the angle of the gangs by draft forces, the spring-urged member is swung out of the way so as to permit the rack to be taken out of engagement with the pinion.

In the drawing:

Figure 1 is a section taken along the line 1—1 of Figure 2 and shows the details of a combination hand and draft angling device;

Figure 2 is a view taken along the lines 2—2 of Figure 1; and,

Figure 3 shows the side view of a harrow to which the angling device of the present invention is applied.

The harrow to which the novel draft angling device of the present invention is applied is claimed and shown in detail in the application of Stephen M. Young, Serial No. 337,233, filed May 25, 1940. For the purpose of the present invention it may be described as including a front frame 10, a pair of front gangs 11, of which only one is shown, a rear frame 13, and a pair of rear gangs 14, of which only one is shown.

The rear frame 13 is connected with the front gangs 11 by means of links 15, of which only one is shown. Control of the angling of the gangs rests in a lever 16 pivoted at a mid-point at 17 on the front frame 10. The lower end of the lever 16 is connected to the front gangs 11 by means of links 18, of which only one is shown. The upper end of the lever 16 is connected to the rear gangs 14 by means of a rod 19, pivotally connected at its forward end in a member 20, and a sleeve 21 slidably receiving the rear end of the rod 19. A cotter pin 22 permits a rearward movement of the rod 19 in the sleeve 21 and prevents forward movement of the rod beyond a certain point. The sleeve 21 is connected to the rear gangs 14 by means of a strap 23 and links 24, of which only one is shown.

The device for angling the harrow gangs is supported on a superstructure 25 secured to the front frame 10 and comprising a pair of members 26 and a pair of members 27, which are secured to one another by means of a bolt 28 and a nut 29. Rotatably mounted on the bolt 28 by means of a sleeve 30 is a pinion gear 31 meshing with a worm 32 on a crank 33 mounted in a casting 34. This casting is secured to the members 26 by means of the bolt 28 and nut 29 and bolts 35. In engagement with the under side of the gear 31 is a rack 36 having a depending projection 37 at its forward end and pivotally secured at its rearward end to the upper end of the lever 16 as at 38. The rack 36 is held in engagement with the gear 31 by means of a roller 39 engaging the under side of the rack 36 and supported by means of members 40 and 41 pivotally mounted at 42 and 43 on the members 26. A spring 44 connecting the member 40 and a rod 45 extending between the members 26 urges the members 26 into the full-line position of Figure 1 in which the roller 39 holds the rack 36 in engagement with the gear 31. By a pull on a cord 46 connected to the upper end of the member 40 the members 40 and 41 may be swung to the dotted-line positions shown in Figure 1 in which the roller 39 is out of engagement with the rack 36, and the rack may be disengaged from the gear 31.

When the rack 36 engages the gear 31, the gangs of the harrow may be adjusted by actuation of the crank 33. Rotation of this crank effects through the worm 32 a rotation of the gear 31 and movement of the rack 36 in the direction of its length. An angular movement of the vertically extending lever 16 is effected, and the consequent longitudinal movement of the links 18 and the rod 19 cause a change in the angle of the gangs. If, for example, in use of the harrow a soft spot is reached, and the tractor is incapable of pulling the harrow in angle out of the soft spot, the gangs are taken out of angle by draft forces in the following manner:

The members 40 and 41 are swung to the dotted-line position of Figure 1, the roller 39 being taken out of contact with the rack 36 and the rack being disengaged from the gear 31. In this position of the parts angular movement of the gangs is possible without rotation of the crank 33. The harrow is backed, the inner ends of the front gangs 11 moving into alinement with one another, the harrow is then pulled forward and the inner ends of the rear gangs 14 move rearward out of angle. The harrow is then pulled out of the soft spot.

The depending projection 37 on the forward end of the rack 36 serves to prevent disengagement of the pinion 31 and the rack by longitudinal movement of the rack. If the rack is moved rearwardly with respect to the gear 31 by rotation of this gear, contact of the depending projections 37 with the roller 39 prevents the rack from moving out of engagement with the gear.

It will be apparent from the foregoing description that a novel angling device for a harrow has been provided, by which the harrow gangs may be angled to a fine adjustment by hand, and the gangs may be put in or out of angle by draft forces.

The intention is to limit the invention only within the scope of the appended claims.

What is claimed is:

1. A harrow comprising a frame, a gang connected therewith, a rotatable member connected with the frame, a member connected with the gang and engageable with the rotatable member for longitudinal movement in response to rotation of the rotatable member, and releasable means for holding the longitudinally movable member in engagement with the rotatable member, whereby the harrow may be angled by rotation of the rotatable member with the member in engagement and by draft forces with the members out of engagement with one another.

2. A harrow comprising a frame, a gang connected therewith, a rack connected with the gang, a gear mounted on the frame, and releasable means holding the gear and rack in driving engagement with one another, whereby the harrow may be angled by rotation of the gear with the gear engaging the rack and may be angled by draft forces with the gear out of engagement with the rack.

3. The harrow specified in claim 1 and further including a crank having a worm portion engaging the rotatable member for rotating the same.

4. The harrow specified in claim 2 and further including a crank having a worm portion engaging the gear for rotating the same.

5. The harrow specified in claim 1, the releasable means comprising a member pivotally connected with the frame and carrying a roller engaging the longitudinally movable member for holding the same in engagement with the rotatable member.

6. The harrow specified in claim 2, the releasable means comprising a member pivotally connected with the frame and carrying a roller engaging the rack for holding the rack in engagement with the gear.

7. A harrow comprising a frame, a superstructure mounted thereon, a gang connected to the frame, a gear rotatably mounted on the superstructure, a rack connected with the gang and extending between the gear and the frame in engagement with the gear, and a member pivotally connected to the superstructure and carrying a roller engaging the under side of the rack.

8. A harrow comprising a frame, a superstructure mounted thereon, a gang connected to the frame, a gear mounted on the superstructure, a vertical lever pivoted at a mid-point to the frame and connected at its lower end to the gang, a rack connected at one end to the upper end of the lever and having a depending projection at the other end and passing between the gear and the frame so as to engage the under side of the gear, a member pivotally mounted on the superstructure between the gear and the frame and carrying a roller, resilient means for holding the member in such a position as to cause the roller to contact the under side of the rack for holding it in engagement with the gear, the swinging of the member to one side against the action of the resilient means allowing the rack to be moved out of engagement with the gear, the depending projection on the end of the rack serving by contact with the roller to prevent the rack from moving longitudinally out of engagement with the gear.

9. A harrow comprising a frame, a gang connected therewith, and means for adjusting the gang with respect to the frame, comprising a vertically extending lever pivoted at a mid-point on the frame, means connecting the lower end of the lever and the gang, a rack bar pivotally connected to the upper end of the lever, a gear meshing with the rack bar, a structure supporting the gear above the frame, and means releasably holding the rack in engagement with the gear.

ARTHUR A. SCARLETT.